(12) United States Patent
Waller

(10) Patent No.: US 6,283,758 B1
(45) Date of Patent: Sep. 4, 2001

(54) SIMULATOR SYSTEM

(75) Inventor: Peter Waller, West Sussex (GB)

(73) Assignee: Thomson Training & Simulation Limited, Crawley (GB)

( * ) Notice: Subject to any disclaimer, the term of this patent is extended or adjusted under 35 U.S.C. 154(b) by 0 days.

(21) Appl. No.: 09/335,173

(22) Filed: Jun. 17, 1999

(30) Foreign Application Priority Data

Jun. 17, 1998 (GB) .................................................. 9813045

(51) Int. Cl.$^7$ .............................. G09B 9/08; G09B 19/16
(52) U.S. Cl. ............................... 434/44; 434/55; 348/123; 353/79
(58) Field of Search .................................. 434/29, 30, 33, 434/37, 38, 40, 43, 44, 55, 58, 62, 307 R, 308, 365; 348/36, 121–123, 335, 756, 781, 787, 789; 352/69, 132; 359/449, 451, 454, 459, 460, 471, 858, 859; 353/30, 46, 69, 79, 94, 98, 99, 122

(56) References Cited

U.S. PATENT DOCUMENTS

| | | | |
|---|---|---|---|
| 3,261,912 | * | 7/1966 | Hemstreet ............................. 348/123 |
| 3,784,742 | * | 1/1974 | Burnham et al. ..................... 348/123 |
| 3,895,861 | * | 7/1975 | Herndon ................................. 352/69 |
| 3,904,289 | * | 9/1975 | Yager ..................................... 353/122 |
| 3,909,523 | * | 9/1975 | Bartucci ................................. 348/781 |
| 4,015,342 | * | 4/1977 | Masselle ................................ 434/44 |
| 4,473,355 | * | 9/1984 | Pongratz ................................ 434/44 |
| 4,512,745 | * | 4/1985 | Mohon et al. ......................... 434/43 |
| 4,551,101 | * | 11/1985 | Neuman ................................ 434/55 |
| 4,599,645 | * | 7/1986 | Brown et al. ......................... 348/123 |
| 5,018,973 | * | 5/1991 | Alet et al. .............................. 434/62 |
| 5,137,348 | * | 8/1992 | Lacroix ................................. 353/79 |
| 5,253,116 | * | 10/1993 | Lacroix ................................. 359/858 |
| 5,433,608 | * | 7/1995 | Murray ................................... 434/29 |
| 6,003,995 | * | 12/1999 | Dugdale et al. ....................... 353/98 |
| 6,042,238 | * | 3/2000 | Blackham et al. .................... 343/94 |

* cited by examiner

Primary Examiner—Joe H. Cheng
(74) Attorney, Agent, or Firm—Nixon & Vanderhye

(57) ABSTRACT

A simulator system in which a visual display assembly is arranged to present an image to be viewed on a display surface and a viewing station is positioned in front of the display surface such that a person looking from a predetermined eyepoint defined within the viewing station can see the display surface through a viewing window defined by the viewing station. The viewing station is displaceable relative to the visual display assembly between first and second positions to adjust the position of the display surface relative to the viewing window when viewed from the eyepoint. During displacement of the viewing station between the two positions, the viewing station is rotated about the eyepoint. The actuator is arranged such that the rate of rotation of the viewing station increases with distance from the first and second positions to a maximum when the viewing station is in an intermediate position.

10 Claims, 2 Drawing Sheets

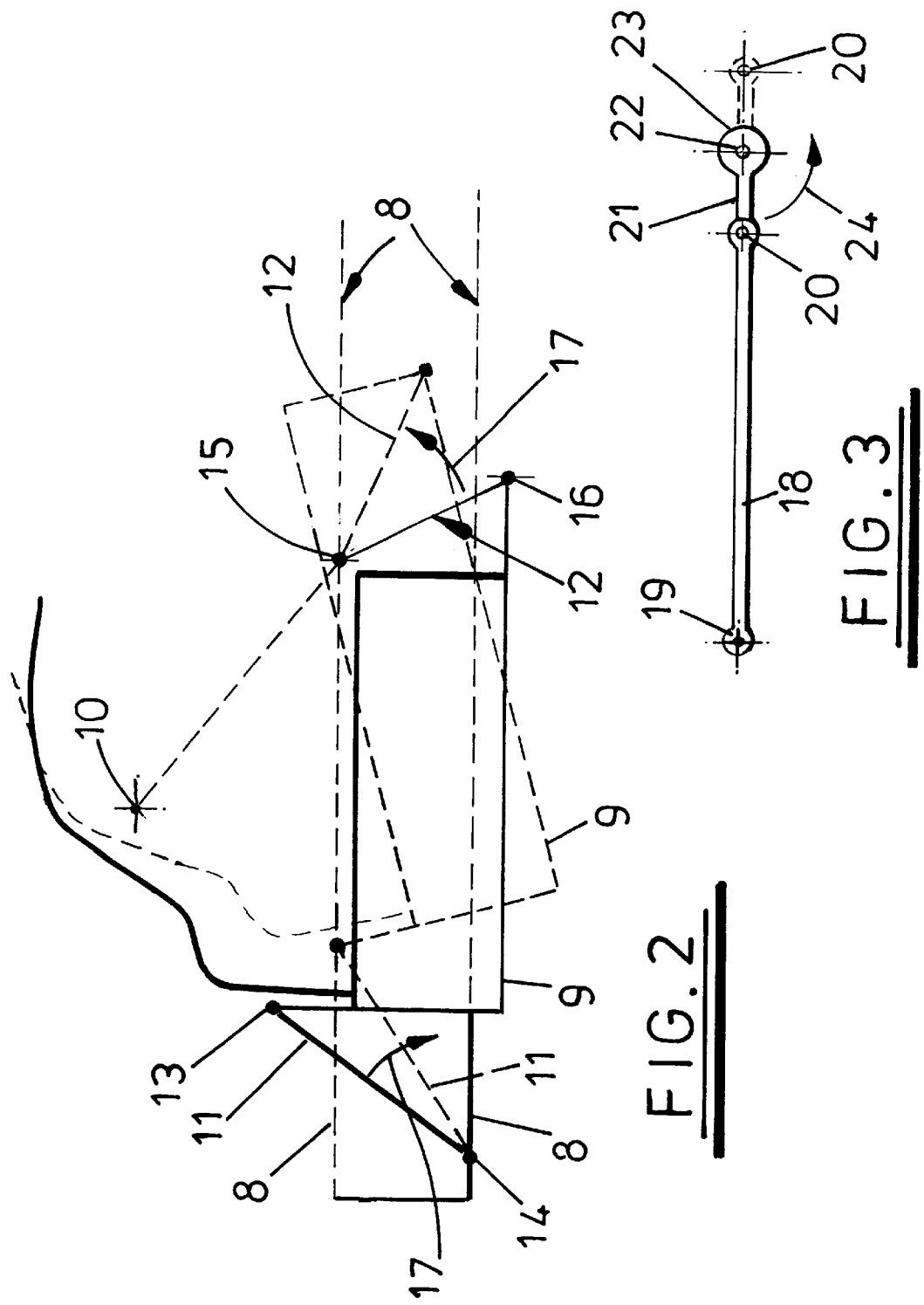

SIMULATOR SYSTEM

BACKGROUND OF THE INVENTION

The present invention relates to a simulator system, and in particular to a simulator system which is suitable for use in a flight simulator.

Flight simulators comprise a viewing station which is occupied by a user of the simulator, the appearance of the viewing station to an occupant being a facsimile of the interior of an aircraft cockpit. The viewing station is mounted on a support frame which is displaceable to simulate in-flight motion. The support frame also supports a visual display assembly arranged to present an image to be viewed on a display surface which is visible from a predetermined eyepoint within the viewing station. Typically, the visual display assembly comprises a back projection screen, a projector positioned to project an image onto the back projection screen, and a concave mirror in which a reflection of the back projection screen is viewed from the predetermined eyepoint through a window defined by the structure of the viewing station. The mirror can be of the order of two meters high and thus defines a relatively large surface area. It is difficult to illuminate the back projection screen with sufficient intensity to provide adequate brightness in the reflection of the back projection screen which is viewed in the mirror.

Flight simulators which are used for simulating take off or landing are used in circumstances in which most of the visually significant image information appears in the lower portion of the view through the viewing station window. Thus it is known to arrange the visual display assembly such that the reflection of the back projection screen occupies only a lower portion of the image viewed through the window, the upper portion being occupied by a "background" display. For some applications however this approach is not acceptable, for example in a simulator for use in in-flight refuelling training. During in-flight refuelling, the aircraft being refuelled must be accurately positioned slightly behind and slightly below a tanker aircraft and as a result the visually significant information occupies upper portions only of the view from the eyepoint through the viewing station windows. Accordingly, in simulators which must be capable of simulating a full refuelling mission including take off, refuelling and landing, it is not possible to maintain an acceptable level of brightness in the significant portions of the viewed scene by arranging the visual display assembly such that the reflection of the back projection screen occupies only a portion of the view from the eyepoint through the viewing station windows. Accordingly in such applications it has been conventional practice to provide a display system with a field of view large enough to satisfy all the requirements, but such an approach requires the use of very large optical components and results in a relatively low brightness low resolution display.

It has been proposed to address the problem outlined above by mounting the viewing station so that it can be displaced relative to the visual display assembly. In this known arrangement, the viewing station is mounted so as to rotate relative to a horizontal axis, rotation of the viewing station adjusting the position of the display surface relative to a viewing window defined by the viewing station. This adjusts the position of the display surface relative to the viewing window when viewed from the predetermined eyepoint, and makes it possible by displacement of the viewing station to appropriately position the visually significant image information relative to the viewing station windows.

Displacement of the viewing station in the known arrangement is difficult to control with sufficient accuracy to avoid the displacement being apparent to an occupant of the viewing station. Firstly, the eyepoint of the viewing station must not move significantly in translation during displacement of the viewing station. Secondly, acceleration of the viewing station relative to the support frame must be miinimised if that acceleration is not to give an occupant of the viewing station false cues. These requirements have proved difficult to achieve with the known arrangement.

SUMMARY OF THE INVENTION

It is an object of the present invention to provide an improved simulator system in which displacement of the viewing station relative to the visual display assembly does not provide an occupant of the viewing station with false cues.

According to the present invention, there is provided a simulator system comprising a visual display assembly arranged to present an image to be viewed on a display surface and a viewing station positioned in front of the display surface such that a person looking from a predetermined eyepoint defined within the viewing station can see the display surface through a viewing window defined by the viewing station, wherein the visual display assembly is mounted in a fixed position on a support frame, and the viewing station is pivotally mounted on the support frame and is connected to an actuator arranged to displace the viewing station relative to the support frame between predetermined first and second positions, the arrangement being such that displacement of the viewing station between the first and second positions causes the viewing station to rotate about the eyepoint, and the actuator being arranged such that the rate of rotation of the viewing station increases with distance from the first and second positions to a maximum when the viewing station is in a third position intermediate the first and second positions.

Preferably, the viewing station is mounted on pivotal links extending from the support frame and defining with the viewing station and the support frame a four bar linkage. The actuator may comprise a constant velocity motor coupled by a pivotal linkage to the viewing station. The pivotal linkage may comprise a link mounted between a pivot mounted on the viewing station and a pivot mounted on an arm extending from a shaft of the motor, the arm being rotatable about a rotation axis of the motor between a first position in which the two pivots are aligned with but on opposite sides of the axis and a second position in which the two pivots are aligned with but on the same side of the axis.

The visual display assembly may comprise a back projection screen, a projector for projecting an image onto the back projection screen, and a concave mirror which defines the display surface. The back projection screen and the mirror are positioned such that a reflection of the back projection screen is visible in the mirror from the eyepoint.

BRIEF DESCRIPTION OF THE DRAWINGS

An embodiment of the present invention will now be described, by way of example, with reference to the accompanying drawings, in which;

FIG. 2 is a schematic representation of the structure shown in FIG. 1; and

FIG. 3 is a schematic illustration of an actuator linkage which is used to modify the geometrical configuration of the assembly of FIG. 2.

DETAILED DESCRIPTION OF THE DRAWINGS

Figure 1:
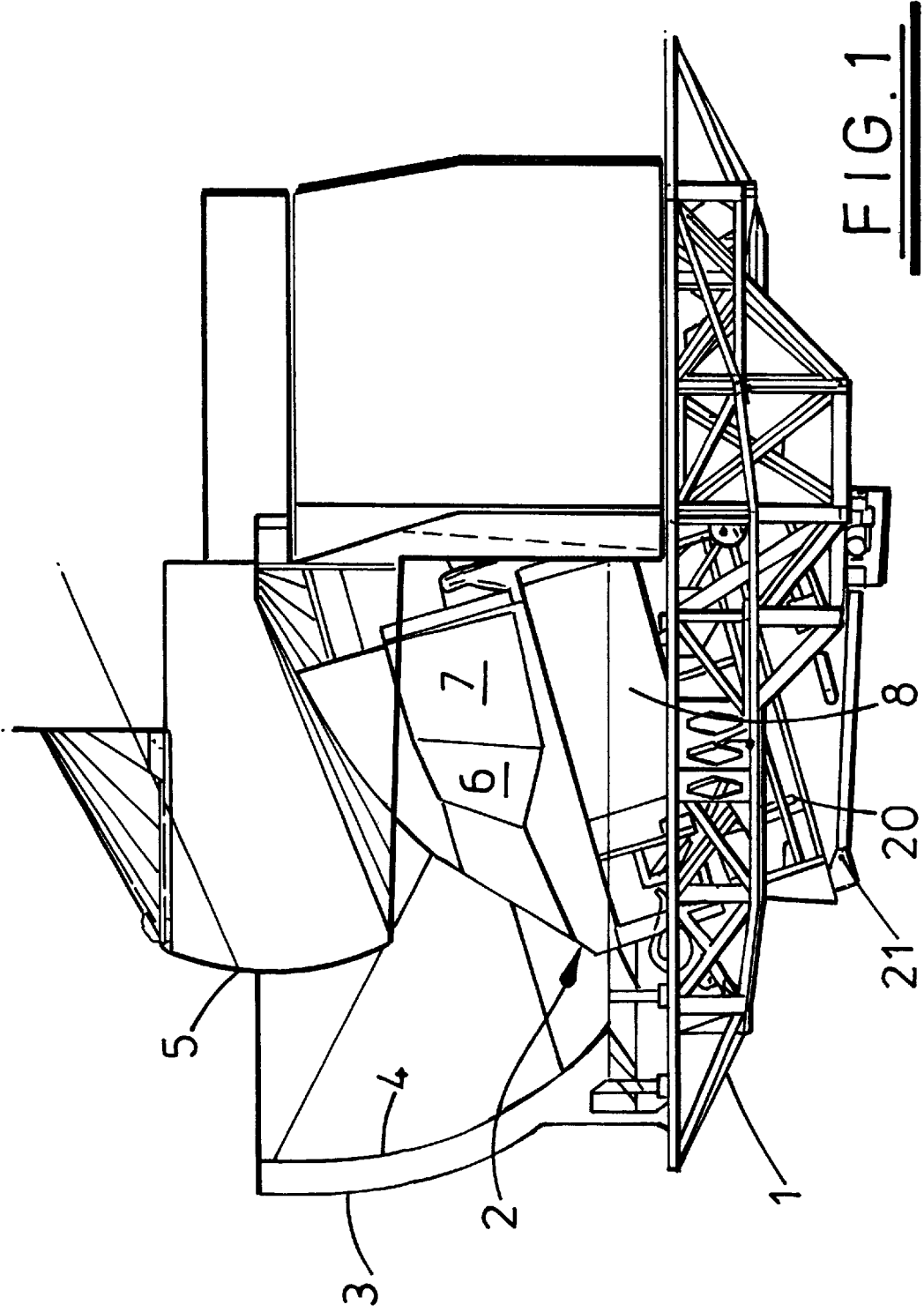
FIG. 1 is a side view of a simulator system in accordance with the present invention.

Referring to FIG. 1, the illustrated assembly comprises a space frame 1 upon which a viewing station 2 the interior of which is a facsimile of an aircraft is pivotally mounted. A visual assembly is also mounted on the frame 1, that assembly comprising a sucked mirror assembly 3 defining a concave mirror surface 4, a back projection screen 5, and a projector (not shown) which is fixedly mounted above and behind the back protection screen 5. The space frame 1 is mounted on a hydraulic motion system (not shown) of conventional form which makes it possible to adjust the orientation of the space frame 1 in response to manipulations of controls in the viewing station and other control inputs. The viewing station defines windows 6 and 7 through which the mirror surface 4 can be viewed, the back projection screen 5 being positioned such that an occupant of the viewing station positioned at a predetermined eyepoint sees a reflection of the back projection screen 5 through the windows 6 and 7. It will be appreciated that the mirror surface 4 is generally U-shaped in that it wraps around both sides of the viewing station, only one half of the surface 4 being shown in FIG. 1.

Referring to FIG. 2, the space frame 1 of FIG. 1 is represented by broken lines 8, and the viewing station is represented by rectangle 9. An occupant of the viewing station 9 is positioned such that the occupant's eye point corresponds with the position 10, from which position the surface 4 (FIG. 1) may be viewed between an upper line (not shown) corresponding to the position of an upper edge of a viewing window and a lower line (not shown) corresponding to the position of a lower edge of a viewing window. A ray from adjacent the upper edge of the back projection screen 5 (FIG. 1) to the mirror surface 4 which is reflected to the eyepoint 10 follows the upper line. A ray from adjacent the lower edge of the back projection screen 5 is reflected to the eyepoint 10 along the lower line.

The viewing station 9 is mounted on pivotal links 11 and 12. The link 11 extends between pivots 13 and 14, and the link 12 extends between pivots 15 and 16. The links 11 and 12, the viewing station 9 and the frame 8 together define a four-bar chain. The pivots 14 and 15 are mounted on the frame 8, and the pivots 13 and 16 are mounted on the viewing station 9. Thus the links 11 and 12 can be rotated from the positions shown in full lines to the positions shown in broken lines in the direction of arrows 17, causing the viewing station 9 to move relative to the space frame 8 from a first position shown in full lines to a second position shown in broken lines. Such a movement of the viewing station causes the viewing station to rotate relative to the space frame 8 about the eyepoint 10 such that the eyepoint is in the same position when the viewing station is in the first and second positions. At intermediate positions between the first and second positions, there is some small displacement of the position of the eyepoint 10, but the eyepoint is substantially the same at each of the extreme positions in the displacement of the viewing station, that is in the said first and second positions.

Referring to FIG. 3. an actuator assembly which can be used to displace the viewing station 9 of FIG. 2 is illustrated. The actuator assembly comprises a link 18 which extends between a first pivot 19 and a second pivot 20. The pivot 19 may be connected to the viewing station 9 of FIG. 2, for example by being connected to a sub-frame of the viewing station. FIG. 1 shows one such arrangement. The pivot 20 is connected to an arm 21 which is mounted on a rotatable shaft 22 of a motor 23. The arm is rotatable with the shaft of the motor in the direction of arrow 24 from the position shown in full lines in FIG. 3 to the position shown in broken lines in FIG. 3.

Thus when the motor is rotated anti-clockwise, the pivot 20 will follow an arc of a circle and will come to rest such that the pivot 20 has moved from a position aligned with but between the pivot 19 and the axis of the shaft 22 and a position aligned with the pivot 19 and the axis of shaft 22 but on the side of the axis remote from the pivot 19.

The motor 23 is designed to deliver substantially constant rotational speed to the arm 21. Given that in the two extreme positions of the viewing station 9 the pivot 20 is aligned with the pivot 19 and the axis of the motor shaft 22, when the motor starts transient rotary accelerations are not coupled into the motion of the viewing station 9. The rotary acceleration of the viewing station 9 starts at zero, builds up to a maximum at approximately half travel, and reduces smoothly to zero. Thus a simple on/off constant angular speed motor can be used to rotate the viewing station 9 relative to the space frame 8. Rotation of the viewing station 9 relative to the space frame 8 adjusts the pitch of the viewing station relative to the vertical unless the motion system (not shown) on Which the space frame 8 is mounted is used to compensate for the rotation of the viewing station. To prevent a change in pitch which would be perceptible to an occupant of the viewing station, the motion system is caused to rotate the space frame 8 in a direction opposite to the direction of rotation of the viewing station 9 relative to the space frame 8. Thus the viewing station remains stationary in pitch and the screen rotates about the eyepoint. Some mismatch of these two rotations during dynamic operation is probable, but is tolerable as long as a strong visual cue is present, such as a horizon or an image of a tanker aircraft in close proximity. The important factor is to avoid a significant static mismatch at the end of the rotational process, as such a static mismatch would indicate to an occupant of the viewing station a climb or descent not matched by instrumentation in the viewing station.

Referring again to FIG. 2, the broken lines represent the location of the viewing station which would be appropriate to the simulation of in-flight refuelling given that most of the image visible from the eyepoint 10 will be above the horizon. Displacement of the arm 21 of FIG. 3 in the clockwise direction and the resultant rotation of the viewing station 9 would cause the position of the horizon to rotate upwards so that the vertical field of view above the horizon would reduce whereas the vertical field of view below the horizon would increase. This will be appropriate to the simulation of take-off or landing. Thus assuming that a mission involving take-off, in-flight refuelling and landing was to be simulated, the viewing station 9 would initially be in the position as shown in full lines in FIG. 2 for take-off, would then be displaced to the position shown in broken lines for in-flight refuelling, and would then be displaced back to the position shown in full lines for landing.

The rotation of the viewing station body is achieved without significant rates of rotary acceleration and therefore to an occupant the horizon appears not to move but the distribution of the vertical fields of view above and below the horizon will change.

In one embodiment of the invention, a rotation about the eyepoint 10 of approximately 16° as between the extreme positions represented in FIG. 2 has been found to provide the necessary adjustment to the vertical field of view. The links 11 at the front of the viewing station body may be formed by an integral structure providing some side-to-side stability.

The links 12 at the rear of the viewing station body may be independent components which do not provide side-to-side stability, but that stability may be achieved by an additional linkage (not shown) which constrains the lower aft edge of the viewing station 9 against movement transverse to the fore and aft direction. Deviation of the eyepoint during movement of the viewing station body is limited and predominantly in the fore and aft directions.

The motor 23 may be a hydraulic rotary actuator. The actuator may have a through shaft 22 connected to arms 21 arranged at either side of the assembly so as to share the load. Such a motor can deliver slow speed, high torque characteristics, is simple to control, and can be stalled without adverse heating effects. Given that in its extreme positions the arms 21 will be aligned with the linkages 18 the forces applied to the motor 23 through the linkages 18 as a result of accelerations of the viewing station 9 resulting from accelerations of the frame 8 will not be able to back drive the actuator assembly.

It will be appreciated that the present invention can be used with any visual display assembly, in which a display surface is positioned in front of a displaceable viewing station not just with a visual display assembly as shown in FIG. 1.

What is claimed is:

1. A simulator system comprising a visual display assembly arranged to present an image to be viewed on a display surface and a viewing station positioned in front of the display surface such that a person looking from a predetermined eye point defined within the viewing station can see the display surface through a viewing window defined by the viewing station, wherein the visual display assembly is mounted in a fixed position on a support frame, and the viewing station is pivotally mounted on the support frame and is connected to an actuator arranged to displace the viewing station relative to the support frame between predetermined first and second positions, and wherein displacement of the viewing station between the first and second positions causes the viewing station to rotate about the eye point, and the actuator being arranged such that the rate of rotation of the viewing station increases until reaching a maximum rate of rotation when the viewing station is in a third position intermediate the first and second positions.

2. A simulator system according to claim 1, wherein the viewing station is mounted on pivotal links extending from the support frame and defining with the viewing station and the support frame a four bar linkage.

3. A simulator system according to claim 2, wherein the actuator comprised a constant velocity motor couple by a pivotal linkage to the viewing station.

4. A simulator system according to claim 2, wherein the visual display assembly comprises a back projection screen, means for projecting an image onto the back projection screen, and a concave mirror which defines the display surface, the back projection screen and mirror being positioned such that a reflection of the back projection screen is visible in the mirror from the eye point.

5. A simulator system according to claim 1, wherein the actuator comprises a constant velocity motor coupled by a pivotal linkage to the viewing station.

6. A simulator system according to claim 5, wherein the pivotal linkage comprises a link mounted between a pivot mounted on the viewing station and a pivot mounted on an arm extending from a shaft of the motor, the arm being rotatable about a rotation axis of the motor between a first position in which the two pivots are aligned with but on opposite sides of the axis and a second position in which the two pivots are aligned with but on the same side of the axis, said first and second positions of the arm corresponding to the first and second predetermined positions of the viewing station.

7. A simulator system according to claim 6, wherein the visual display assembly comprises a back projection screen, means for projecting an image onto the back projection screen, and a concave mirror which defines the display surface, the back projection screen and mirror being positioned such that a reflection of the back projection screen is visible in the mirror from the eye point.

8. A simulator system according to claim 5, wherein the visual display assembly comprises a back projection screen, means for projecting an image onto the back projection screen, and a concave mirror which defines the display surface, the back projection screen and mirror being positioned such that a reflection of the back projection screen is visible in the mirror from the eye point.

9. A simulator system according to claim 1, wherein the visual display assembly comprises a back projection screen, means for projecting an image onto the back projection screen, and a concave mirror which defines the display surface, the back projection screen and mirror being positioned such that a reflection of the back projection screen is visible in the mirror from the eyepoint.

10. A simulator system according to claim 1, comprising a motion system operable to rotate said support frame simultaneously to said movement of the viewing station between said predetermined first and second positions but in an opposite rotational direction, thereby maintaining the viewing station at a substantially constant pitch during said movement.

* * * * *